United States Patent Office 2,792,328
Patented May 14, 1957

---

2,792,328

INSECT REPELLENT

Edmund M. Socec, Augusta, Maine

No Drawing. Application December 11, 1950,
Serial No. 200,309

1 Claim. (Cl. 167—24)

This invention relates to insectifuges and particularly to insect repellents which can be applied to the skin of human beings.

The prime object of this invention is to provide an effective repellent which will deter insects such as mosquitoes, midges, gnats, flies, chiggers and other biting insects from alighting on the surface to which the repellent is applied. Another object is to provide a repellent, the effects of which will continue over a long period of time after application. A further object is to provide a repellent which is simple and inexpensive to produce. A still further object is to provide a repellent which will not be harmful to the skin of the user, and which will not be destructive to clothing with which it may come in contact. Other objects and advantages of my invention will become apparent in the detailed description which follows.

An insect repellent made according to the invention comprises a substantially petroleum-free emulsion including a major proportion of water, the repellent components piperonyl butoxide and pyrethrins, preferably in an amount not substantially less than 7½% by weight, and at least 12% and not more than 18% emulsifier by weight.

The basic ingredients of my insectifuge, in a preferred form, consists of (by weight):

|  | Percent |
|---|---|
| Piperonyl butoxide | 10 |
| Pyrethrins | 1 |
| Emulsifiers | 16 |
| Water | 73 |

Piperonyl butoxide and pyrethrins are available in the form of a mixture which consists of (by weight):

|  | Percent |
|---|---|
| Piperonyl butoxide | 66⅔ |
| Pyrethrins | 6⅔ |
| Inerts | 26⅔ |

Reference is made to U. S. Patent 2,485,681 where the synthesis of piperonyl butoxide is discussed. The chloromethyl derivative of dihydrosafrol is used as a starting material. It has the formula:

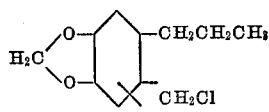

This is the chloromethyl derivative of 3,4-methylenedioxylphenyl propane. This material is reacted with the sodium salt of diethylene glycol monobutyl ether (butyl Carbitol), a compound commonly used as a substitute for glycerine in cosmetics and drugs, with the formula:

The reaction of these materials is illustrated by the following equation:

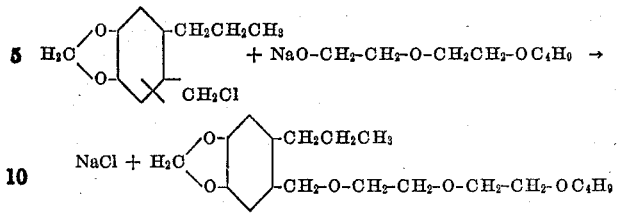

According to Wach in U. S. Patent 2,485,681, the sodium salt of butyl Carbitol is prepared by adding 22 parts of sodium hydroxide to 162 parts butyl Carbitol in 90 parts benzene. The mixture is refluxed using a water trap until no more water is collected (about 18 hours).

The solution is then cooled and under continued cooling 106 parts of the chloromethyl derivative of dihydrosafrol in 45 parts of benzene are added. The mixture is allowed to stand over-night and is then refluxed for four hours. The salt separating out is washed with water, and the benzol solution dried and the benzol distilled off. The remaining oil is distilled in vacuo. Some of the excess butyl Carbitol distills over. The final product distills at about 195° at 2 mm. This compound called piperonyl butoxide is a colorless oil, soluble in benzene, isopropanol and most organic solvents.

Pyrethrins are obtained commercially from the flowers of a chrysanthemum grown in Jugoslavia, Japan, Kenya, and Uganda. The active ingredients are extracted from the dried flower heads by organic solvents. The mixture of pyrethrins preferably used in my invention and referred to above consists of:

|  | Percent |
|---|---|
| Pyrethrins | 20 |
| Pyrethrin extractions | 40 |
| Purified mineral oil | 40 |

The piperonyl butoxide and pyrethrins act in synergy to give a greatly improved insectifugal quality to the preparation.

The emulsifiers preferably used in my invention consist of 50% each of compounds commonly known under the trade names of Span 85 and Tween 85 (produced by the Atlas Powder Co.). These emulsifiers consist essentially of a mixture of sorbitan trioleate and sorbitan trioleate polyoxyalkylene. Obviously other conventional emulsifiers may be substituted. The mixture of piperonyl butoxide and pyrethrins discussed above is a concentrated solution, and when mixed with water that is slightly acid (which is usually the case with chlorinated waters) and the above mentioned emulsifying agents an effective, virtually odorless, non-toxic emulsion is produced that may be used as often as desired by human beings. A further important feature of my use of these emulsifiers is that they form a filmy residue or coating which will hold the water, pyrethrins and piperonyl butoxide in solution for long periods of time when the emulsion is applied to the skin.

In the prior art it is well known that pyrethrins and piperonyl butoxide can be used in solution with an inert liquid as an insecticide spray or in other forms as an insecticide powder. Pyrethrins and piperonyl butoxide as a basic ingredient have not been heretofore usable as an insect repellent. Formerly this basic ingredient has been used only as an insecticide. In ordinary use a petroleum distillate such as deodorized kerosene, or other volatile oil, was used as an inert vehicle for the basic active ingredient. If such a petroleum distillate were used in this emulsion, it would become dangerous to apply to the skin of a human being due to the dermal toxicity of the petroleum distillates. In some instances water has been used in a mixture of the basic ingredient and a lesser quantity of distillate for spray purposes because it was generally assumed that the distillate in some quantity was an essential vehicle. However, I have discovered that the distillate may be eliminated almost entirely by increasing the proportion of emulsifier used in the emulsion to about 16% by weight and adding water. The water emulsion which I use is quite harmless. Furthermore the large proportion of emulsifiers used in my emulsion produces the extraordinary result of causing the repellency of the piperonyl butoxide and pyrethrins to last much longer than would be the case if only a water solution with a small (1%) emulsifier component were employed.

Ordinarily it is necessary to agitate my emulsion before application to get all of the basic ingredient in solution with the emulsifier and water. The emulsion is then applied to the exposed skin liberally. Thereafter it should be effective for eight or more hours at normal temperatures without further application. My field test reports show that the emulsion affords freedom from bites for periods from 2½ hours at temperatures of 92 degrees F. up to 16 hours at temperatures of 70 degrees F.

Known repellents generally are characterized by somewhat offensive odors, and may also soak into fabrics, creating a lasting stain. In addition to being quite harmless to the skin, my emulsion is also inoffensive in odor to the human nostril, and in fact seems to have little or no odor. Although human beings find the odor unnoticeable, insects approaching a surface to which it has been applied seem to be repulsed by the smell. During the greater part of the effective period, mosquitoes and like pests will not alight on a surface covered by my emulsion. During the latter part of the effective period, insects may light on a treated surface but will not bite or feed for several hours.

My emulsion is non-injurious to paints, plastics, fabrics, varnishes, silk, nylon or rubberized equipment, and when spilled or coming in contact with clothing or fishing equipment such as nylon leaders and the like it is quite harmless. Many repellents will stain the clothing and do irreparable damage to fishermen's flies, leaders and other equipment. My repellent washes away readily when the object with which it has come in contact is rinsed in water.

The emulsion of my invention discussed above has been shown to contain approximately 11% by weight of the repellent components piperonyl butoxide and pyrethrins.

I have found that the repellent components can be decreased from 11% to 7½% by weight without any substantial loss in effectiveness. By increasing the proportion of repellent components to 12½% the effectiveness of the resulting emulsion is only slightly increased, although an increase to 15% causes my emulsion to last for much longer periods. However, due to the cost of the repellent components it has generally been commercially impractical to increase the proportions above the 11% discussed. It is, of course, possible to add a greater proportion of repellent components without endangering human beings using my emulsion.

It is also feasible to combine the emulsion described in my invention with sun-tan lotions and cosmetics. Where such admixture is attempted, the solution added should be of approximately the same density and viscosity as the emulsion of my invention; otherwise the two constituents will not be readily miscible. Furthermore any dilution of the emulsion of my invention by combination with other fluids will inevitably result in a diminution of the effective strength of the insectifuge corresponding to the extent of the dilution. Of course the added advantages to be gained from combining a sun-tan lotion employing an ultra-violet screen, for example, with my insectifuge, may offset the loss of strength of repellency.

I claim:

A non-toxic insect repellent consisting of the following components by weight: 10% piperonyl butoxide, 1% pyrethrins, 16% of an emulsifier which is a combination of sorbitan trioleate and a polyalkylene derivative of sorbitan trioleate and 73% water.

References Cited in the file of this patent

UNITED STATES PATENTS

| | | |
|---|---|---|
| 1,755,178 | Grant | Apr. 22, 1930 |
| 2,000,004 | Adams | May 7, 1935 |

OTHER REFERENCES

McAlister et al.: Article in Jour. of Econ. Entomology, December 1947, pp. 906–909.

Soap and Sanitary Chem., November 1948, p. 147.

Schroeder et al.: Article in Jour. of Econ. Entomology, December 1948, pp. 890–894.

Moore: Article in Jour. of Econ. Entomology, April 1950, pp. 207–213.

Atlas Spans and Atlas Tweens, pub. by Atlas Powder Co., Wilmington, Delaware, November 1942.

Goldman: Archives of Dermat. and Syphilology, vol. 62, No. 2, August 1950, pages 245–260.

Shepard: Chemistry and Action of Insecticides, 1st ed., 1951, pages 467 and 470.